(12) United States Patent
Frank

(10) Patent No.: US 9,422,923 B2
(45) Date of Patent: Aug. 23, 2016

(54) ROTOR BEARING FOR A WIND POWER GENERATING PLANT

(75) Inventor: Hubertus Frank, Höchstadt (DE)

(73) Assignee: IMO Holding GmbH (DE)

(*) Notice: Subject to any disclaimer, the term of this patent is extended or adjusted under 35 U.S.C. 154(b) by 0 days.

(21) Appl. No.: 13/980,680

(22) PCT Filed: Jan. 19, 2012

(86) PCT No.: PCT/EP2012/000230
§ 371 (c)(1),
(2), (4) Date: Sep. 30, 2013

(87) PCT Pub. No.: WO2012/097989
PCT Pub. Date: Jul. 26, 2012

(65) Prior Publication Data
US 2014/0023305 A1    Jan. 23, 2014

(30) Foreign Application Priority Data
Jan. 19, 2011 (DE) .................. 10 2011 008 958

(51) Int. Cl.
| | | |
|---|---|---|
| *F16C 27/08* | (2006.01) | |
| *F03D 11/00* | (2006.01) | |
| *F16C 19/38* | (2006.01) | |
| *F16C 25/08* | (2006.01) | |

(52) U.S. Cl.
CPC ......... *F03D 11/0008* (2013.01); *F16C 19/381* (2013.01); *F16C 25/08* (2013.01); *F16C 2300/14* (2013.01); *F16C 2360/31* (2013.01); *Y02E 10/722* (2013.01)

(58) Field of Classification Search
CPC ..................................... F16C 27/08
USPC .......................... 384/620, 618, 622
See application file for complete search history.

(56) References Cited

U.S. PATENT DOCUMENTS

| | | | | |
|---|---|---|---|---|
| 1,965,407 A | * | 7/1934 | Doughty | 384/620 |
| 4,808,013 A | * | 2/1989 | Waddington | 384/495 |
| 4,906,112 A | * | 3/1990 | Gobel et al. | 384/548 |
| 4,923,313 A | * | 5/1990 | Bergling | 384/571 |
| 5,433,536 A | * | 7/1995 | Bergling | 384/620 |

(Continued)

FOREIGN PATENT DOCUMENTS

| | | |
|---|---|---|
| DE | 17 558 | 10/1959 |
| DE | 19 29 815 | 12/1965 |

(Continued)

*Primary Examiner* — Thomas R. Hannon
(74) *Attorney, Agent, or Firm* — Pandiscio & Pandiscio

(57) ABSTRACT

A rolling bearing, particularly a rotor bearing, or main bearing, for a wind power generating plant, the bearing having at least two mutually concentric rings separated from each other by a gap in which one or more rows of rolling elements roll along raceways on both rings, such that the two rings are rotatable in mutually opposite directions about their common axis, wherein each ring has at least one connection surface for connection to a foundation, wherein the connection surfaces extend parallel to one another and are passed through approximately perpendicularly by a plurality of fastening bores for receiving fastening bolts extending through them or screwed into them, wherein the raceway of at least one rolling-element row is formed on a part separate from the ring concerned and is pushed away from the ring concerned in a direction perpendicular to the connection surfaces, by at least one resilient element.

18 Claims, 2 Drawing Sheets

(56) References Cited

U.S. PATENT DOCUMENTS

| | | | |
|---|---|---|---|
| 2002/0124911 A1* | 9/2002 | Hetzner | 148/233 |
| 2003/0127161 A1* | 7/2003 | Burrier, Jr. | 148/539 |
| 2003/0185478 A1* | 10/2003 | Doll et al. | 384/492 |
| 2006/0140527 A1* | 6/2006 | Takamizawa et al. | 384/620 |
| 2006/0153485 A1* | 7/2006 | Maeda et al. | 384/569 |
| 2010/0316322 A1* | 12/2010 | Derrer et al. | 384/571 |

FOREIGN PATENT DOCUMENTS

| | | |
|---|---|---|
| DE | 15 75 433 | 11/1969 |
| EP | 2 256 285 | 12/2010 |

\* cited by examiner

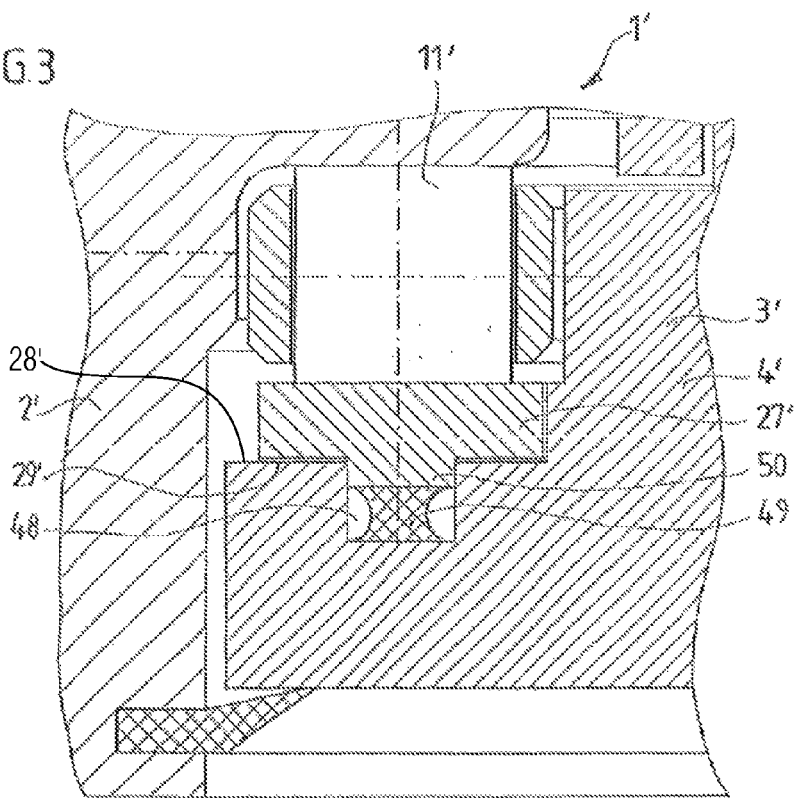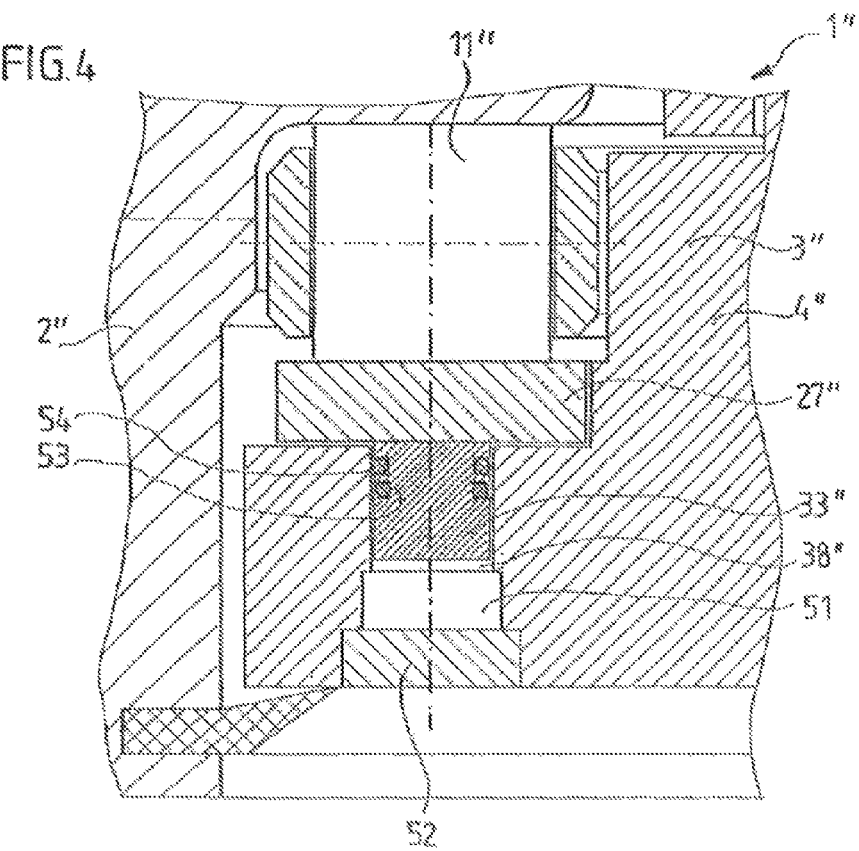

ROTOR BEARING FOR A WIND POWER GENERATING PLANT

BACKGROUND OF THE INVENTION

1. Field of the Invention

The invention is directed to a rolling bearing, particularly a rotor bearing or main bearing for a wind power generating plant, having at least two mutually concentric rings that are separated from each other by a gap in which one or more rows of rolling elements roll along raceways on both rings, such that the two rings can be rotated in mutually opposite directions about their common axis, wherein each ring has at least one planar, annular, preferably raised connection surface for connection to a machine part, plant part, chassis or foundation, wherein the connection surfaces extend parallel to one another and are passed through approximately perpendicularly by a plurality of fastening bores for receiving fastening bolts that are inserted all the way through them or screwed into them.

2. Description of the Prior Art

Since larger machines and plants are generally more advantageous commercially than smaller ones, there has been a steady trend toward increasingly large capacities. Particularly clear evidence of this phenomenon can be seen in the steadily increasing overall size and power rating of wind power generating plants, although similar effects can also be noted elsewhere, for instance in the ever-greater size of ships and aircraft. This trend carries with it a need for increasingly large rolling bearings for such equipment. In wind power generating plants, this relates primarily to the main bearing for supporting the rotor, the yaw or nacelle bearing for pivoting the nacelle, and finally, the blade bearings for changing the pitch of the rotor blades. The blade bearings are in turn responsible for most of the strain on the main or rotor bearing, since the latter must absorb the repeated wind pressure from the blade bearings in the axial direction; it must support the entire weight of the rotor in the radial direction, including the hub and the rotor blades; and finally, it has to rotate the most constantly. Consequently, triple-row roller bearings are used preferentially as main bearings for wind power generating plants, due in particular to their much longer service life than that of other rolling bearing designs.

In all mountings where loads are transmitted across oblique contact angles, the bearings are subject to increased expansion due to the compliance of the adjacent structure. The effects can be seen in the form of greater leakage of lubricating agents, increased sliding movements by the rollers when idle, greater ovalization of the bearing rings, etc. In triple-row bearings, however, which transmit the loads to a radial raceway with a contact angle of 0° and the tilting moments and axial loads to two axial rows with a contact angle of 90°, these effects are smaller, regardless of whether rollers or balls are used as the load-transmitting elements.

Triple-row roller bearings have a relatively narrow axial clearance, however, which is troublesome particularly in wind turbine applications.

Furthermore, roller bearings are much more sensitive than ball bearings to standstill vibrations. Efforts are therefore being made to develop bearings for such applications that operate under bias as much as possible.

The axial play of the bearing can be narrowed further by the bolt clamping forces exerted on the bearing rings by the fastening bolts, and undesirably high biases can occur in the axial rows if the ring geometry is unfavorable.

To incorporate a bearing of this kind, therefore, an extremely delicate compromise must be reached among the various requirements: On the one hand, these bearings should run very smoothly; on the other hand, they should ideally be adjusted free of play. With rotor bearings several meters in diameter, such adjustment and fine-tuning of play is very labor-intensive, and even relatively small changes in environmental conditions, e.g. temperature changes, can disrupt the sensitive balance struck between freedom from play and moderate bias.

Added to this is the fact that load distributions on the individual axial raceways and the radial raceway can differ greatly, depending on the load case. For example, load situations can actually arise where an axial row is largely or completely load-free, and the rolling elements in that row do not roll sufficiently or even stand still. In this case, the rolling elements drag over the raceway and the worrisome phenomenon of flat wear can develop, particularly in the form of abrasions. From the disadvantages of the described prior art comes the problem initiating the invention: in a rolling bearing of this species, to eliminate the described disadvantages that occur particularly in the case of large bearing diameters of approximately one meter or more.

SUMMARY OF THE INVENTION

This problem is solved by the fact that a raceway of at least one rolling-element row is formed on a raceway ring that is separate from the connection ring concerned and that is pushed away from the particular connection ring, in a direction perpendicular to the connection surfaces, by a device comprising at least one resilient and/or elastically compressible element.

A spring element of this kind makes it possible to produce and/or adjust a bias, particularly in a direction perpendicular to the connection surface of the ring concerned. As a result, the rolling elements of a rolling-element row remain under a load created by the bias even when no external loads are being applied to the row, thus reliably keeping the rolling elements from sliding. At the same time, unduly high bias is prevented by the compliance of the springs. Finally, a measure of this kind makes it possible to avoid any narrowing of the bearing play by the clamping force of the fastening bolts and/or due to slight unevenness in a connected machine part or plant part. The direction of bias from the connection ring concerned refers to the local direction in the region of the closest-together surfaces of the connection ring and the raceway ring. In the region of these directly confronting surfaces the two rings are pushed away from each other, i.e., apart. This can be effected by a pressure means, and has the additional advantage that one or more such pressure means can be disposed on the side of the raceway ring, particularly its front side, that faces the raceway per se, i.e., can be aimed, in a direction parallel to the axis, straight at the rolling elements rolling along the raceway. This eliminates the possibility of tilting, twisting or the like. By the same token, these pressure means or their anchoring means do not extend all the way through the raceway ring, thus ensuring a continuous raceway surface uninterrupted by anchoring means or the like. Finally, such preferably pressure-exerting spring elements are particularly easy to produce: for example, they can be disposed in trough- or groove-shaped depressions in the connection ring, and are thus extremely space-saving. For controllable pressure means, for example hydraulic pressure means, the drive lines concerned can be led out in rectilinear extension, hence in a row perpendicular to the raceway concerned, and can be contacted or connected there—preferably in the region of the end face of the particular connection ring that faces the connection surface—if not in the ring itself, for example by means of a circumferential connection channel. Since the necessary pressure-application or adjustment mechanism can thus be installed in the axial direction immediately under the raceway concerned, the connection elements of the particular connection ring can be configured as throughbores without it being necessary to increase the cross section of the particular ring. The risk of fracture is considerably reduced by the fact that the guide means or anchoring means are loaded primarily in compression rather than in tension.

It has proven advantageous for one or preferably both of the connection rings to have an axial extent that is smaller than the outer diameter of the radially outer connection ring, for example smaller than the maximum diameter of the gap, preferably smaller than the inner diameter of the radially inner connection ring, and which is preferably smaller than the outer radius of the outer ring, particularly smaller than the inner radius of the inner ring. By means of the raceway ring according to the invention, such delicate bearing rings, with their limited inherent rigidity, can be used without further modifications even in wind power generating plants or the like, since any deformation due to loads and/or an uneven connecting structure are tolerated by the movable raceway ring.

The rolling elements of at least one row can be configured as rollers. Although rollers are subject to the risk of flat wear in the case of partial unloading, they will not slide or drag, because they are maintained in friction-locked contact with the raceways by the bias according to the invention.

It is within the scope of the invention that plural rows of rolling elements are provided, particularly at least three. In this way, for example, a respective row of rolling elements is provided for forces in each of the two axial directions and another row is provided for radial forces.

Additional advantages are gained if the raceway ring has an approximately rectangular cross-sectional geometry, with the longer main axis extending parallel to the particular connection surface. Such a geometry facilitates a minimal axial height for a bearing according to the invention, so the two connection surfaces of two oppositely rotatable components can be disposed a minimal distance apart, which is important for many use cases.

The invention can be developed further by having the direction of pressure application of at least one resilient and/or elastically compressible element extend parallel to the fastening bores in the particular connection ring. In particular, this eliminates effects of the clamping forces of these fastening means. If, for example, the connection ring per se is deformed by these forces, then the raceway ring can move in relation to it and thus compensate for stress-induced local deformations.

The raceway ring is preferably pushed toward the connection surface of the particular connection ring. The raceway ring is then located on the side of the particular rolling-element row facing away from this connection surface, and can, for example, be adjusted or serviced from this relatively accessible side.

A particularly advantageous arrangement is obtained if the raceway ring pushes the rolling elements that roll along it against a nose ring of the other connection ring. In this case, the raceway ring is not disposed on the nose ring, but on the respective other connection ring, and therefore pushes toward the center plane of the bearing, with the result that the elastic pushing means face toward an outer bearing end side and ideally can be accessed from that side, for maintenance purposes, for example.

By virtue of the invention, it is possible for two rows of rolling elements to be maintained under bias in the axial direction by a raceway ring, one rolling-element row of the two preferably being on the near side of the nose ring and the other one on the far side of the nose ring. Such an arrangement results when a respective row of rolling elements runs along each of the two flanks of a circumferential flange. These two rows of rolling elements are then, so to speak, lined up one after the other in the axial direction and can be placed under bias together by means of a single clamping device.

The invention is further distinguished by at least one piston element, to which pressure is applied by a resilient and/or elastically compressible element and which is thereby pressed against the raceway ring. Since the raceway ring absorbs the pressure force of one or more piston elements and distributes it over its annular base plane, it is quite possible to use a plurality of discrete, mutually separated, particularly piston-shaped pressure elements instead of a single pushing device distributed over the entire circumference. Such a piston can be and remain separate from the raceway ring per se, it can be connected thereto, or it can even be produced integrally therewith. The choice of the best variant is guided primarily by the ability to achieve optimal mechanical behavior for the assembly as a whole and by ease of installation (and removal) of the assembly.

At least one such piston element can be guided in a guide opening of the particular connection ring, particularly in a bore thereof. The particular cross-sectional fit between the piston element and such a receiving guide opening can be configured as a transition fit, to keep both friction and play to a feasible minimum.

It is further provided according to the invention that at least one piston element is sealed with respect to its guide opening, for example by means of at least one fully circumferential sealing ring. This serves to keep lubricant from the raceway region from getting into the area behind the piston and potentially altering the resilience characteristics.

The maximum deflection of at least one piston element can be limited, particularly by an adjustable stop. The maximum play of the raceway ring can be limited in this way, so the bearing will basically keep working even if a spring means is defective in addition, the bearing according to the invention is thus given defined characteristics, which will characterize its behavior in the worse case of maximal excursion of the raceway ring.

The invention can be realized by having at least one resilient element configured as a disc spring or as a disc spring pack whose disc springs are preferably stacked one behind the other in the longitudinal direction of the fastening bores. The discs are preferably metal rings whose cross section is not planar, however, but instead extends along a very shallow conical surface. In a disc spring pack, these rings can be stacked so that the opening angles of the conical surfaces of adjacent rings open upward and downward in alternation. To stabilize a pack of this kind, the rings concerned can be passed through by a rear portion or shaft region of the piston or a rod anchored therein, a bolt screwed therein or the like. The effect of arrangement parallel to the fastening bores is a pressing force that is perpendicular to the particular raceway plane.

According to a preferred further development of the invention, at least one disc spring or at least one disc spring pack is located on the same radial straight line as a fastening bore of the particular connection ring. These are the locations where the influence of the tensions created in the particular connection ring by the fastening bolts is greatest, so the effect of the biasing device according to the invention is maximal there.

A further design rule is that at least one disc spring pack must be passed through by a piston element that pushes against the raceway ring. To receive the spring force from the disc spring pack, the piston element has a rear abutment surface for the disc spring pack; to achieve this purpose, this abutment surface is larger than the central opening in a disc spring.

In the context of another embodiment of the invention, it is provided that at least one resilient, elastically compressible and/or adjustable element has at least one chamber that is or can be filled with a fluid, particularly with a hydraulic oil. If this chamber is filled with the particular medium and then placed under pressure, a corresponding pressure force is exerted against the inner surface of the chamber. If—as the invention further provides—the chamber is located at the back end of a piston element, this pressure force acts in the region of the piston element on the back side thereof and thereby pushes it against the raceway ring placed against the front side thereof, to press said raceway ring against the row of rolling elements located there.

Finally, it is within the teaching of the invention that at least one elastically compressible element is seated in a depression, particularly in a bore or in a fully circumferentially groove. Whereas a piston element cushioned by means of disc springs can be guided in an opening that is open at the back and the chamber can be made sealable at the back for a hydraulic pressure medium, particularly hydraulic oil, the arrangement can also be realized in such a way that an opening that is closed at the back is provided in the connection ring to receive an elastically compressible element, for example made of hard rubber or, if appropriate, a still harder material, which pushes directly against the back side of a piston element seated in front of or in this opening, or the back side of the raceway ring.

The bias can be produced not only by means of disc spring packs or other spring designs, but also by means of permanently elastic elements or, alternatively, by pneumatic or hydraulic means. The bias created is transmitted to the row of rolling elements via the raceway ring. It has proven advantageous to adjust the magnitude of the load applied by the bias to a value that is within a range of 2% to 20% of the dynamic load capacity. At values above this range the negative influence on service life can predominate, whereas below this range it is impossible to ensure that the bias will be effective.

The spring elements are inserted in cylindrical depressions in the retaining ring, the nose ring or the raceway ring. If they are inserted in the retaining ring, the bias can be influenced from the outside, for example by means of bolts. If the bias is produced pneumatically or hydraulically, the energy can be supplied via a corresponding ring conduits and the bias regulated centrally. Smoothness of operation can also be influenced in this way, and any wear on the raceways can be at least partially compensated.

It is also conceivable to have the spring elements inserted in one or more annularly circumferential grooves. Such a groove can also be used to guide the raceway ring and receive the spring elements. In this case, a particularly suitable spring element is an elastic profile that can be inserted in a groove of this kind.

The raceways of large slewing bearings are typically hardened, particularly inductively hardened. This can also be done with the raceway ring according to the invention. Due to process limitations, there is a narrow spot at which the hardness is reduced between the beginning and the end of a raceway hardened in the forward-feed process. This so-called hardness gap can be lowered with respect to the rest of the particular raceway by abrasive grinding, so the rolling elements rolling over it do not transmit a load at that location. If the raceways and the intermediate ring are inductively hardened gaplessly by a special method that requires at least two induction heads, then there is no hardness gap and no need to abrasively grind the raceway, which has an advantageous effect on the smoothness of operation of the bearing.

BRIEF DESCRIPTION OF THE DRAWINGS

Further features, details, advantages and effects based on the invention will become apparent from the following description of a preferred embodiment of the invention and by reference to the drawing. Therein:

FIG. 3 is a modified embodiment of the invention in a representation corresponding to FIG. 2; and FIG. 4 is a further modified embodiment of the invention in a representation corresponding to FIG. 2.

DESCRIPTION OF THE PREFERRED EMBODIMENTS

Figure 1:
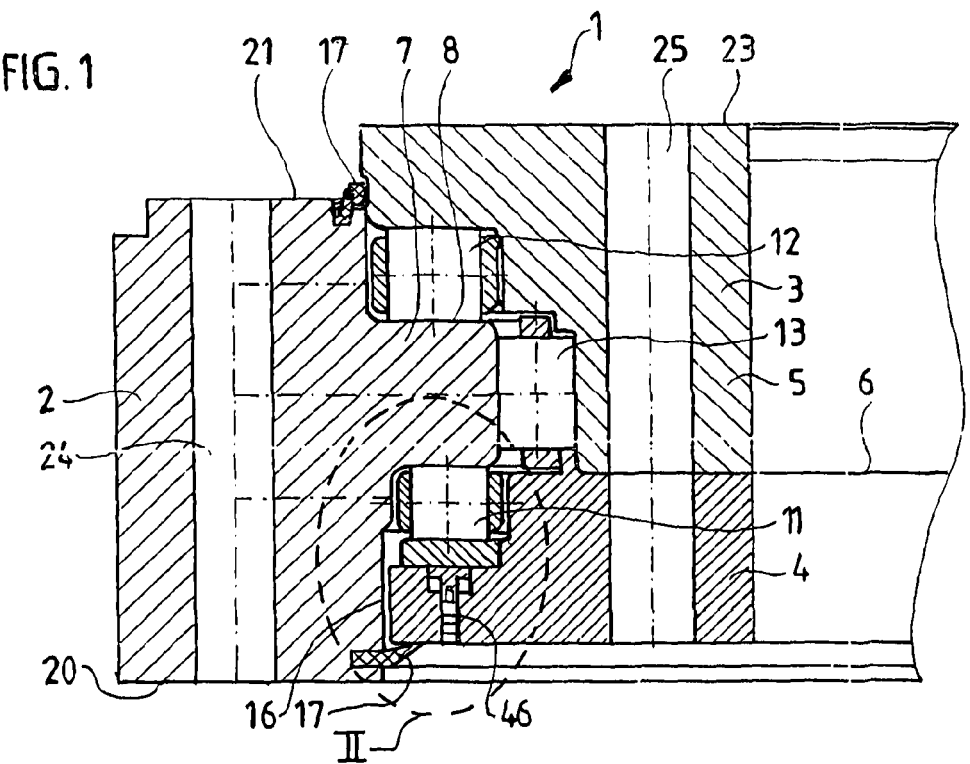
FIG. 1 is a sectional view through a rolling bearing according to the invention, partially cut away.

FIG. 1 is a section taken transversely through an annular rolling bearing 1 according to the invention. This is a large rolling bearing, of the kind used, for example, in wind power generating plants, for example as the rotor bearing or main bearing thereof. Clearly, similar designs could also be used for other purposes: for example, as the blade bearings or the yaw or nacelle bearing of a wind power generating plant.

In the case illustrated, the viewer will recognize an outer ring 2 configured as a nose ring and, disposed concentrically therein, an inner ring 3, which is preferably divided into two subrings 4, 5 abutting each other along a plane 6. The ring 3 formed by these adjoining subrings 4, 5 has an approximately C-shaped cross section and surrounds the nose or a circumferential flange 7 of the nose ring 2 on the top and bottom surfaces 8, 9 thereof with a gap 10, such that the two rings 2, 3 can be rotated in mutually opposite directions.

In the exemplary embodiment shown, provided in the gap 10 is a total of three rows of rolling elements 11, 12, 13, all of which roll along the flange 7, specifically on its planar top surface 8, its planar bottom surface 9, and also on a concavely cylindrical face 14 that connects these two surfaces 8, 9 to each other. Should the nose ring be configured as the inner ring, on the other hand—which can also be contemplated—then connecting face 14 on the flange 7 would be cylindrical rather than concavely cylindrical.

The rolling elements 11, 12, 13 in this exemplary embodiment are rollers, but tapered rolling elements are also conceivable, as are balls. The individual rolling elements 11, 12, 12, 13 are held in their positions relative to each other by cages 15.

The gap 10 is preferably filled with a lubricant, for example grease. To prevent this from leaking out of mouth regions 16 of the gap 10, these regions 16 are sealed, preferably each by a respective circumferential sealing ring 17, which is inserted by its cross-sectionally rearward region in a circumferential groove 18 of a connection ring 2, 3 and which by virtue of its inherent elasticity is pressed by its frontward cross-sectional region, which preferably tapers to a sealing lip 19, against a surface region of the respective other ring 3, 2 and extends therealong.

Each of the two rings 2, 3 has two substantially planar end faces 20, 21, 22, 23, one of which per ring 2, 3 serves as a connection surface. These two connection surfaces 20, 23 are raised above the adjacent end face 22, 21 of the respective other ring 3, 2, thus enabling a bearing 1 of this kind to be fitted between planar connection surfaces of two plant and/or machine parts without any problems and without the need for grinding. The two connection surfaces 20, 23 are parallel to each other.

To secure a respective connection ring 2, 3 to a respective such plant part or machine part or foundation, each connection ring 2, 3 has a plurality of fastening bores 24, 25, which are distributed coronally along the respective ring 2, 3 and pass perpendicularly through the connection surface 20, 23 concerned. Whereas in the illustrated example these fastening bores 24, 25 are configured as bores that extend all the way between these two end faces 20, 21 or 22, 23, many or all of the fastening bores 24, 25 could also be configured as blind bores provided with an internal thread.

Whereas all the raceways of the nose ring 2 are formed directly on its circumferential flange 7, particularly by machining its molded body, into which the fastening bores 24 are also machined, particularly drilled, only two of the three raceways of the C-shaped ring 3 are formed directly on the latter, particularly by machining its molded body, into which the fastening bores 25 are also machined, particularly drilled. In the example shown, the ring concerned is subring 5, comprising connection surface 23.

The third raceway of the cross-sectionally C-shaped ring 3 preferably is not disposed directly thereon, i.e., neither on subring 5 comprising connection surface 23 nor on the other subring 4; subring 4 thus has no raceway in the present example. Instead, a raceway 26 concerned—along which the rolling elements 11 travel—is disposed on a dedicated raceway ring 27 located in the region of a channel 28 of the particular cross-sectionally C-shaped ring 3, particularly on its subring 4.

In the example illustrated, this raceway ring 27 has a rectangular cross section whose longer sides are the flat sides 26, 29 of the raceway ring 27, while its shorter sides are, respectively, a cylindrical jacket surface 30 of the raceway ring 27 and a concavely cylindrical jacket surface 31 thereof. The side 29 facing away from the raceway 26 would rest on a planar boundary surface 32 of the channel 28 if it were not pushed away from it and toward the rolling elements 11 by one or more piston elements 33.

Figure 2:
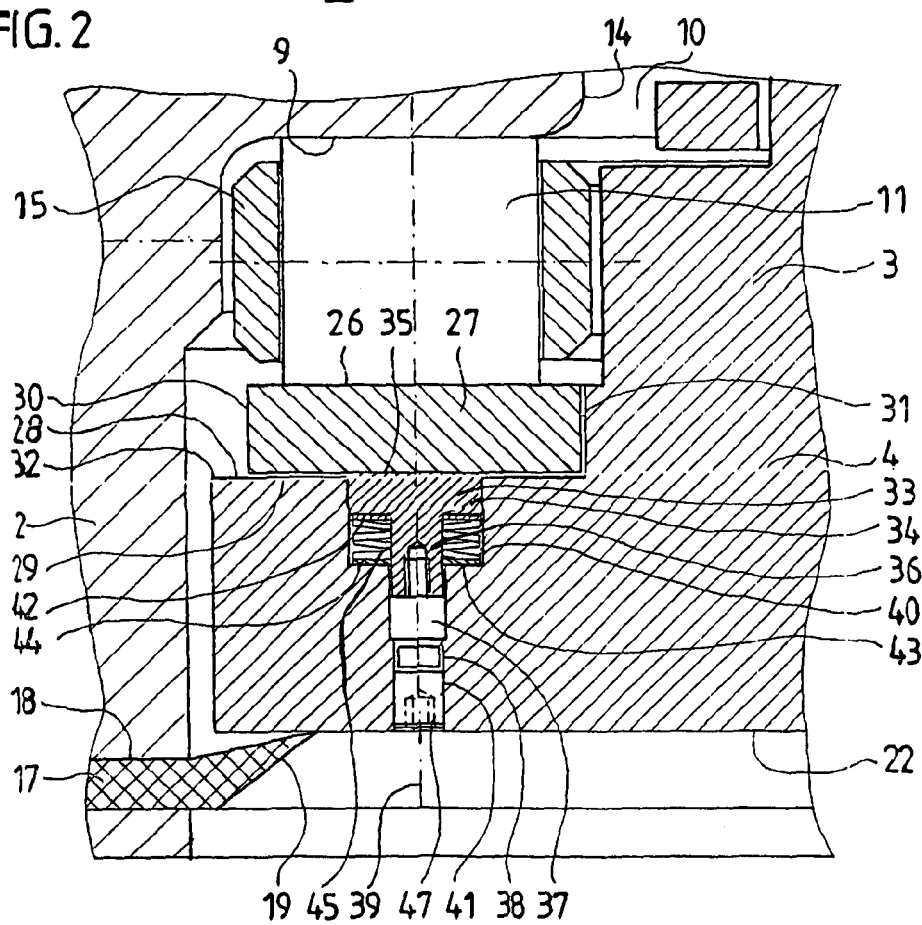
FIG. 2 is an enlargement of detail 11 from FIG. 1.

FIG. 2 is an enlarged representation of such a piston element 33. It comprises a head 34 with a planar top side 35 for contacting the planar back side 29 of the raceway ring 27, and a rear shaft region 36 that is tapered relative to the head 34. In the exemplary embodiment shown, the head 34 and the shaft 36 each have a circular cross section, the respective centers being aligned with each other. A stop element 37 can be screwed onto the free end of the shaft 36, and preferably has the same cross section as the shaft 36.

This piston element 33 is guided slidably in the longitudinal direction 39 of its shaft 36 in an opening 38 of the particular ring, preferably the C-shaped ring, particularly the inner ring 3, here specifically subring 4. This shaft longitudinal direction 39 is therefore also the longitudinal direction of the opening 38, which, in turn, extends perpendicularly to the connection surface 23 and thus parallel to the fastening bores 25.

Opening 38 extends all the way through the respective ring 3, 4 from the boundary surface 32 of the channel 28 to end face 22, and has a stepped cross section. A region 40—an upper region, in FIG. 2—close to the raceway ring 27 or close to the boundary surface 32 of the channel 28 has a cross section approximately corresponding to that of the head 34, while a region 41 of the opening 38—a lower region, in FIG. 2—near the end face 22 approximately corresponds in cross section to the cross section of the piston shaft 36, and thus is tapered cross-sectionally relative to the upper region 40.

The upper region 40 is longer in axial extent than the height of the head-like broadening 34 of the piston element 33. Since—as will be explained further below—the piston element 33 is constantly being pressed upward, where it butts against the bottom side 29 of the raceway ring 27, in the normal case the top side 35 of the head 34 is always flush with or above the boundary surface 32 of the channel 28. An annular space 44 thus remains free below a step 42 of the piston element 33, between its head 34 and shaft 36, on the one side and above a step 43 of the opening 38 between its widened upper region 40 and its tapered lower region 41.

This annular space 44 serves to accommodate a pack of annular disc springs 45 stacked one on top of the other. These annular discs are not flat, however, but are slightly conically deformed. They rest atop one another with the their conical openings directed alternatingly upward and downward, so that they are in contact with each other only along their inner or outer edges. The topmost and bottommost disc springs 45 rest each against a respective step 42, 43 and push them apart, as a result of which the piston element 33 is subjected to an upward pressure—in this case, toward connection surface 23—and thus pushes the raceway ring 27 against the particular row of rolling elements 11. Where appropriate, a (respective) washer could further be provided between an (or each) outermost disc spring 45 and the respective step 42, 43.

The tapered region 41 of the opening 38 can be tapered again in its lower region, particularly to a smaller cross section than the stop element 37 at the free bottom end of the piston shaft 36; an additional step 46 created in this way then forms an abutment for the stop element 37, which is ultimately braced by the step 46 if the disc spring pack 45 becomes overloaded.

In addition, the bottommost portion of the tapered region 41 could be provided below the step 46 with an internal thread, so that the opening 38 can be sealed by screwing in a cap 47, bolt or the like.

The raceway ring 27 is preferably surface-hardened, particularly in the region of its raceway 26 and/or its bottom side 29. If the axial extent of the raceway ring 27 is not too large, the raceway ring 27 could also be through-hardened.

The spring constant and the number of disc springs 45 per pack are adjusted so that in the case of normal operation the bias exerted on the raceway ring 27 by this disc spring pack 45 and passed along to the rolling elements 11 is equal to approximately 2% to 20% of the dynamic load capacity of this rolling-element row 11.

FIG. 3 shows a modified embodiment of the invention, in which a bearing 1' with its outer ring 2' and its inner ring 3' corresponds on the whole to bearing 1 from FIG. 1. Here, however, the piston elements 33, through-passing openings 38 and disc spring packs 45 are absent. Instead, provided here in the region of a channel 28' below a raceway ring 27' is a groove 48 that extends all the way along a ring 3' or subring 4', and in which an elastic profile 49 is seated. The raceway ring 27', on which the rolling elements 11' roll, then rests directly on the top surface of this profile. To guide raceway ring 27', the latter can have on its bottom side 29' a preferably formed-on, or alternatively fastened-on, circumferential attachment 50 whose width is approximately equal to the width of the groove 48 and whose height is slightly greater than the difference between the depth of the groove 48 and the height of the profile 49 seated therein.

A further modified embodiment of the invention can be found in FIG. 4, where a bearing 1" with its outer ring 2" and its inner ring 3" corresponds on the whole to bearing 1 from FIG. 1. Here, piston elements 33" and the respective openings 38" to receive them are provided; there are no disc spring packs 45, however.

Instead, the openings 38" are connected in their bottom regions by a groove 51 in the nature of an annular channel, which runs all the way around a ring 3" or subring 4" and which in turn is sealed by a ring 52 seated and fixed therein, for example by welding or gluing. The openings 38" form with the annular channel 51 a closed cavity into which a preferably fluid medium, for example hydraulic oil, can be funneled through a feed line (not shown) and placed under pressure.

So that this medium, particularly hydraulic oil, cannot leak up out of the openings 38", the piston elements 33" seated therein are sealed. For this purpose, they each have a cylindrical shape with a cross section approximately corresponding to that of the openings 38", but comprise on their jacket side one or more fully circumferential grooves 53 in each of which a respective sealing ring 54 is inserted.

The pressure of the medium, particularly hydraulic oil, can be used to adjust the contact pressure of a raceway ring 27" against a particular rolling-element row 11". This can be done just once, during the filling of the annular space 51; or at each maintenance; or, if appropriate, in an ongoing manner, for example by means of a pressure regulator.

The invention claimed is:

1. A rolling bearing having at least two mutually concentric connection rings separated from each other by a gap in which one or more rows of rolling elements roll along raceways on the rings, such that the two rings can be rotated in opposite directions about their common axis, wherein each ring has at least one planar, annular connection surface for connection to a machine part, plant part, chassis or foundation, wherein the connection surfaces extend parallel to each other and are passed through generally perpendicularly by a plurality of fastening bores for receiving fastening bolts that pass through or are screwed into them, wherein a raceway on a first one of the connection rings for at least one of the rolling-element rows is formed on a raceway ring that is separate from the first connection ring concerned, and is pushed away from the connection ring concerned, in a direction perpendicular to the connection surfaces, by a device comprising at least one resilient element and/or at least one elastically compressible element and/or at least one adjustable element, wherein at least one piston element is subject to pressure applied by the at least one resilient element and/or by the at least one elastically compressible element and/or by the at least one adjustable element, and is thereby pressed against the raceway ring, wherein a maximum deflection of the at least one piston element is limited by a stop element.

2. A rolling bearing according to claim 1, for a wind power generating plant, wherein the raceway ring is provided with an approximately rectangular cross section whose longer sides are flat sides of the raceway ring, one of these flat sides of the raceway ring constituting the raceway and the other of these flat sides facing away from the raceway would rest on a planar boundary surface of a channeling of the first connection ring if it were not pushed away from it, a) wherein a second one of the connection rings is configured as a nose ring with a circumferential flange facing to the gap, a first row of rolling elements rolling on a planar top surface of the flange, a second row of rolling elements rolling along a planar bottom surface of the flange, and a third row of rolling elements rolling along a cylindrical or concavely cylindrical face of the flange connecting its both planar surfaces with each other;

b) wherein the first connection ring has an approximately C-shaped cross section and surrounds the circumferential flange on its top and bottom surfaces with a clearance;

c) wherein two rows of rolling-elements are maintained under bias in an axial direction by one raceway ring, namely the first row of rolling elements rolling on the planar top surface of the flange, and the second row of rolling elements rolling along the planar bottom surface of the flange, d) and wherein the raceway ring is through-hardened or is surface-hardened in the region of its raceway and/or in the region of its bottom side.

3. The rolling bearing in accordance with claim 2, wherein said at least one piston element is guided in a guide opening of one of the connection rings.

4. The rolling bearing as in claim 3, wherein said at least one piston element is sealed with respect to its guide opening by at least one fully circumferential sealing ring.

5. The rolling bearing as in claim 4, wherein a maximum deflection of the at least one piston element is limited by an adjustable stop.

6. The rolling bearing in accordance with claim 2, wherein at least one of the connection rings is provided with an axial extent smaller than an outer diameter of a radially outer connection ring, or smaller than a maximum diameter of the gap, or smaller than an inner diameter of a radially inner connection ring, or smaller than an outer radius of the radially outer connection ring, or smaller than an inner radius of the radially inner connection ring.

7. The rolling bearing in accordance with claim 1, wherein the rolling elements of at least one row of rolling elements are configured as rollers.

8. The rolling bearing in accordance with claim 1, wherein at least three rows of rolling elements are provided.

9. The rolling bearing as in accordance with claim 1, wherein the raceway ring is provided with an approximately rectangular cross-sectional geometry, with a longer main axis extending parallel to one of the connection surfaces.

10. The rolling bearing in accordance with claim 1, wherein the raceway ring is adapted to be pushed toward the connection surface of one of the connection rings.

11. The rolling bearing in accordance with claim 1, wherein the raceway ring is adapted to push the rolling elements that roll along it against a circumferential flange of a second one of the connection rings.

12. The rolling bearing in accordance with claim 1, wherein at least one resilient element comprises a disc spring or a disc spring pack whose disc springs are stacked one behind the other in or parallel to a longitudinal direction of the fastening bores.

13. The rolling bearing in accordance with claim 12, wherein the at least one disc spring, or the at least one disc spring pack, is disposed on the same radial straight line from the axis of rotation of the bearing as one of the fastening bores of the first connection ring.

14. The rolling bearing in accordance with claim 13, wherein the at least one disc spring pack is passed through by the at least one piston element that pushes against the raceway ring.

15. The rolling bearing in accordance with claim 1, wherein the at least one resilient element or the at least one elastically compressible element and/or the at least one adjustable element is provided with at least one chamber adapted to be filled with hydraulic oil.

16. The rolling element in accordance with claim 15, wherein the chamber is disposed at a back end of a piston element.

17. The rolling bearing in accordance with claim 1, wherein the at least one elastically compressible element is seated in a depression.

18. A rolling bearing, for a wind power generating plant, the bearing having at least two mutually concentric connection rings separated from each other by a gap in which several rows of rolling elements roll along raceways on the rings, such that the two rings can be rotated in opposite directions about their common axis, wherein each ring has at least one planar, annular, connection surface for connection to a machine part, plant part, chassis or foundation, wherein the connection surfaces extend parallel to each other and are passed through generally perpendicularly by a plurality of fastening bores for receiving fastening bolts that pass through or are screwed into them, wherein a raceway on a first one of the connection rings for at least one of the rolling-element rows is formed on a raceway ring that is separate from the first connection ring concerned, and is pushed away from the connection ring concerned, in a direction perpendicular to the connection surfaces, by a device comprising at least one resilient element and/or at least one elastically compressible element and/or at least one adjustable element, wherein the raceway ring is provided with an approximately rectangular cross section whose longer sides are flat sides of the raceway ring, one of these flat sides of the raceway ring constituting the raceway and the other of these flat sides facing away from the raceway would rest on a planar boundary surface of a channeling of the first connection ring if it were not pushed away from it, a) wherein a second one of the connection rings is configured as a nose ring with a circumferential flange facing to the gap, a first row of rolling elements rolling on a planar top surface of the flange, a second row of rolling elements rolling along a planar bottom surface of the flange, and a third row of rolling elements rolling along a cylindrical or concavely cylindrical face of the flange connecting its both planar surfaces with each other;

b) wherein the first connection ring has an approximately C-shaped cross section and surrounds the circumferential flange on its top and bottom surfaces with a clearance;

c) wherein two rows of rolling-elements are maintained under bias in an axial direction by one raceway ring, namely the first row of rolling elements rolling on the planar top surface of the flange, and the second row of rolling elements rolling along the planar bottom surface of the flange, d) wherein the raceway ring is through-hardened or is surface-hardened in the region of its raceway and/or in the region of its bottom side;

with at least one piston element which is subject to pressure applied by the at least one resilient element and/or by the at least one elastically compressible element and/or by at least one adjustable element, and is thereby pressed against the raceway ring;

wherein said at least one piston element is guided in a guide opening of one of the connection rings;

wherein said at least one piston element is sealed with respect to its guide opening by at least one fully circumferential sealing ring;

wherein the at least one elastically compressible element is seated in a depression.

\* \* \* \* \*